(12) United States Patent
Nakano et al.

(10) Patent No.: US 9,294,683 B2
(45) Date of Patent: Mar. 22, 2016

(54) IMAGE PICKUP DEVICE AND FOCAL PLANE SHUTTER

(71) Applicant: SEIKO PRECISION INC., Narashino-shi, Chiba (JP)

(72) Inventors: Yoichi Nakano, Narashino (JP); Motoharu Sakurai, Narashino (JP)

(73) Assignee: SEIKO PRECISION INC., Narashino-shi (JP)

( * ) Notice: Subject to any disclaimer, the term of this patent is extended or adjusted under 35 U.S.C. 154(b) by 204 days.

(21) Appl. No.: 14/190,590

(22) Filed: Feb. 26, 2014

(65) Prior Publication Data
US 2014/0247387 A1    Sep. 4, 2014

(30) Foreign Application Priority Data
Mar. 1, 2013    (JP) .................. 2013-040274

(51) Int. Cl.
| | |
|---|---|
| H04N 5/238 | (2006.01) |
| H04N 5/235 | (2006.01) |
| H04N 5/335 | (2011.01) |
| G03B 15/03 | (2006.01) |
| G03B 9/70 | (2006.01) |
| G03B 9/42 | (2006.01) |

(52) U.S. Cl.
CPC ............ *H04N 5/2353* (2013.01); *G03B 9/42* (2013.01); *H04N 5/238* (2013.01)

(58) Field of Classification Search
CPC . H04N 5/2353; H04N 5/2354; H04N 5/3532; G03B 7/093; G03B 15/0452

USPC .......... 348/367, 362, 296; 396/194, 195, 235, 396/357, 479, 480, 247, 354, 358, 443, 463, 396/245; 352/209
See application file for complete search history.

(56) References Cited

U.S. PATENT DOCUMENTS

| | | | |
|---|---|---|---|
| 6,490,416 B1 * | 12/2002 | Nakano .................. | G03B 9/70 396/183 |
| 2004/0047626 A1 | 3/2004 | Miyazaki | |
| 2008/0240708 A1 * | 10/2008 | Takahashi ............... | G03B 9/40 396/484 |
| 2008/0252768 A1 * | 10/2008 | Suzuki ................ | H04N 5/2254 348/312 |
| 2012/0134660 A1 * | 5/2012 | Nakano .................. | G03B 9/36 396/468 |
| 2013/0202282 A1 * | 8/2013 | Kosaka .................. | G03B 9/66 396/357 |

FOREIGN PATENT DOCUMENTS

| | | |
|---|---|---|
| JP | H09-244100 | 9/1997 |
| JP | 2004-101860 A1 | 4/2004 |
| JP | 2012-186682 A1 | 9/2012 |

* cited by examiner

*Primary Examiner* — Sinh Tran
*Assistant Examiner* — Xi Wang
(74) *Attorney, Agent, or Firm* — Kratz, Quintos & Hanson, LLP

(57) ABSTRACT

An image pickup device includes: a focal plane shutter including: a board including an opening; a leading shutter and a trailing shutter moving to open and close the opening; a leading-shutter actuator and a trailing-shutter actuator respectively causing the leading shutter and the trailing shutter to move; a leading-shutter sensor detecting that the leading shutter passes through a first position; and a trailing-shutter sensor detecting that the trailing shutter passes through a second position, an image pickup element that light enters through the opening; and a drive control portion.

13 Claims, 12 Drawing Sheets

IMAGE PICKUP DEVICE AND FOCAL PLANE SHUTTER

CROSS-REFERENCE TO RELATED APPLICATION

This application is based upon and claims priority to Japanese Patent Application No. 2013-040274 filed on Mar. 1, 2013, subject matter of these patent documents is incorporated by reference herein in its entirety.

BACKGROUND (i) Technical Field

The present invention relates to image pickup devices and focal plane shutters.

(ii) Related Art

There is known a focal plane shutter used in an image pickup device. In a focal plane shutter in Japanese Patent Application Publication No. 2004-101860, a leading shutter and a trailing shutter are moved by respective actuators.

There might be variations in periods from when the actuator starts being energized to when the leading shutter or the trailing shutter starts moving, or in movement speeds of the leading shutter and the trailing shutter, depending on a use condition, a use term, accuracy of parts, and the like. Thus, there might be variations in an exposure period.

SUMMARY

It is therefore an object of the present invention to provide an image pickup device and a focal plane shutter that suppress variations in an exposure period.

According to an aspect of the present invention, there is provided an image pickup device including: a focal plane shutter including: a board including an opening; a leading shutter and a trailing shutter moving to open and close the opening; a leading-shutter actuator and a trailing-shutter actuator respectively causing the leading shutter and the trailing shutter to move; a leading-shutter sensor detecting that the leading shutter passes through a first position; and a trailing-shutter sensor detecting that the trailing shutter passes through a second position, an image pickup element that light enters through the opening; and a drive control portion correcting power supplied to the leading-shutter actuator while the leading shutter is moving, on a basis of a leading-shutter approach movement period from when the leading-shutter actuator starts being energized such that the leading shutter opens the opening to when the leading shutter passes through the first position, the drive control portion correcting power supplied to the trailing-shutter actuator while the trailing shutter is moving, on a basis of a trailing-shutter approach movement period from when the trailing-shutter actuator starts being energized such that the trailing shutter closes the opening to when the trailing shutter passes through the second position.

According to another aspect of the present invention, there is provided an image pickup device including: a focal plane shutter including: a board including an opening; a leading shutter and a trailing shutter moving to open and close the opening; a leading-shutter actuator and a trailing-shutter actuator respectively causing the leading shutter and the trailing shutter to move; a leading-shutter sensor detecting that the leading shutter passes through a first position; and a trailing-shutter sensor detecting that the trailing shutter passes through a second position, an image pickup element that light enters through the opening; and a drive control portion correcting power supplied to the trailing-shutter actuator while the trailing shutter is moving, on a basis of a leading-shutter approach movement period and a trailing-shutter approach movement period, the leading-shutter approach period being from when the leading-shutter actuator starts being energized such that the leading shutter opens the opening to when the leading shutter passes through the first position, the trailing-shutter approach period being from when the trailing-shutter actuator starts being energized such that the trailing shutter closes the opening to when the trailing shutter passes through the second position.

According to another aspect of the present invention, there is provided a focal plane shutter including: a board including an opening; a leading shutter and a trailing shutter moving to open and close the opening; a leading-shutter actuator and a trailing-shutter actuator respectively causing the leading shutter and the trailing shutter to move; a leading-shutter sensor detecting that the leading shutter passes through a first position; and a trailing-shutter sensor detecting that the trailing shutter passes through a second position, wherein power supplied to the leading-shutter actuator is corrected while the leading shutter is moving, on a basis of a leading-shutter approach movement period from when the leading-shutter actuator starts being energized such that the leading shutter opens the opening to when the leading shutter passes through the first position, and power supplied to the trailing-shutter actuator is corrected while the trailing shutter is moving, on a basis of a trailing-shutter approach movement period from when the trailing-shutter actuator starts being energized such that the trailing shutter closes the opening to when the trailing shutter passes through the second position.

According to another aspect of the present invention, there is provided a focal plane shutter including: a board including an opening; a leading shutter and a trailing shutter moving to open and close the opening; a leading-shutter actuator and a trailing-shutter actuator respectively causing the leading shutter and the trailing shutter to move; a leading-shutter sensor detecting that the leading shutter passes through a first position; and a trailing-shutter sensor detecting that the trailing shutter passes through a second position, wherein power supplied to the trailing-shutter actuator is corrected while the trailing shutter is moving, on a basis of a leading-shutter approach movement period and a trailing-shutter approach movement period, the leading-shutter approach period being from when the leading-shutter actuator starts being energized such that the leading shutter opens the opening to when the leading shutter passes through the first position, the trailing-shutter approach period being from when the trailing-shutter actuator starts being energized such that the trailing shutter closes the opening to when the trailing shutter passes through the second position.

DETAILED DESCRIPTION

In the following, a description will be given of embodiments.

First Embodiment

Figure 1:
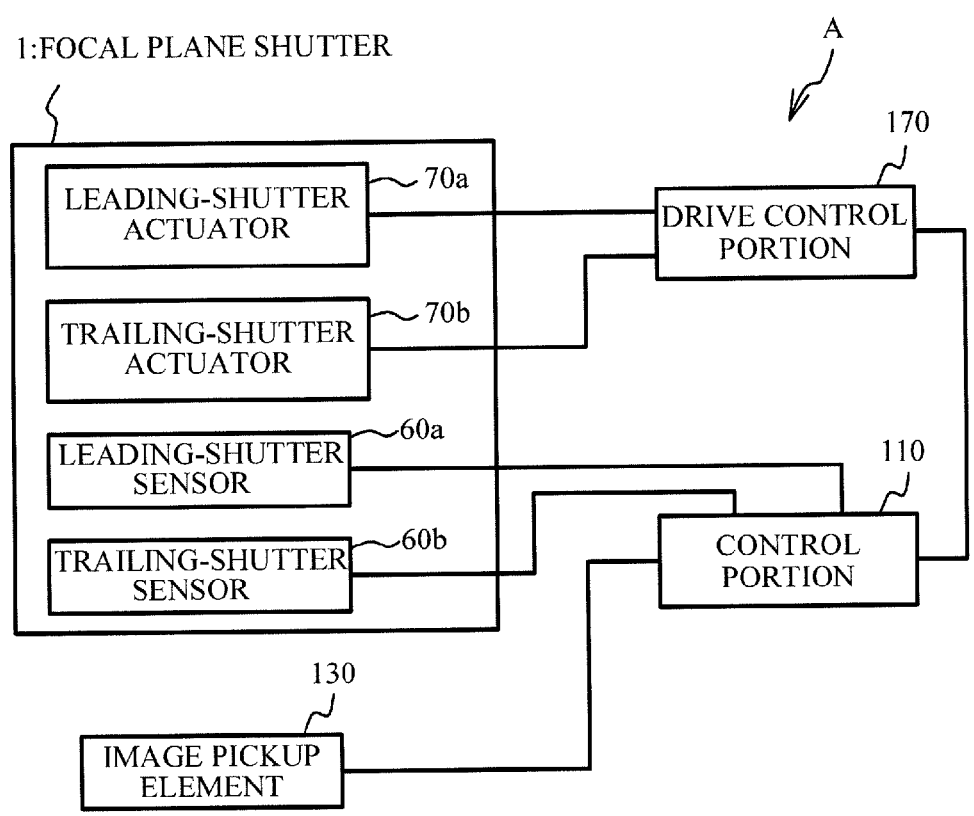
FIG. 1 is a block diagram of a camera including a focal plane shutter.

FIG. 1 is a block diagram of a camera (image pickup device) A including a focal plane shutter 1. The camera A includes the focal plane shutter 1, a control portion 110, an image pickup element 130, and a drive control portion 170. The focal plane shutter 1 includes a leading shutter-actuator (hereinafter, referred to as actuator) 70a, a trailing-shutter actuator (hereinafter, referred to as actuator) 70b, a leading-shutter sensor (hereinafter, referred as sensor) 60a, and a trailing-shutter sensor (hereinafter, referred as sensor) 60b, as will be described later in detail.

The drive control portion 170 controls the drive of the actuators 70a and 70b in accordance with the instruction from the control portion 110. The drive control portion 170 includes a CPU. The control portion 110 instructs the drive control portion 170 in accordance with the signals from the sensors 60a and 60b, as will described later in detail. In response to this instruction, the drive control portion 170 controls the drive of the actuators 70a and 70b. The control portion 110 controls the operation of the whole camera, and includes the CPU, a ROM, and a RAM. The image pickup element 130 is a CMOS. The image pickup element 130 is a light receiving element that converts subject images into electric signals on the basis of photoelectric conversion. Moreover, the camera A includes lenses, not illustrated in FIG. 1, for adjusting a focal length.

Figure 2:
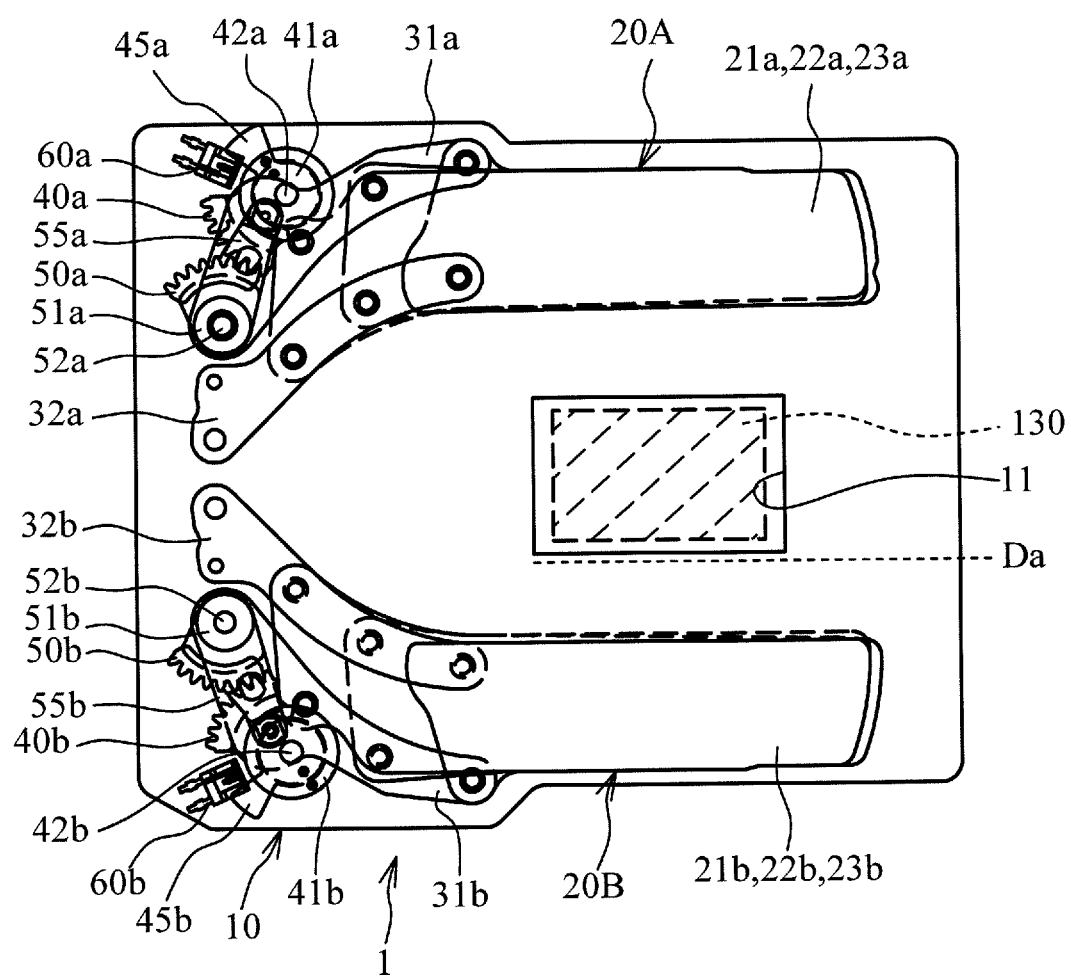
FIG. 2 is a front view of the focal plane shutter.

FIG. 2 is a front view of the focal plane shutter 1. In FIG. 2, the actuators 70a and 70b are omitted. The focal plane shutter 1 includes a board 10, a leading shutter 20A, a trailing shutter 20B, arms 31a, 32a, 31b, and 32b, and the actuators 70a and 70b. The board 10 is provided with a rectangular opening 11. FIG. 2 illustrates an imaging surface of the image pickup element 130 within the opening 11.

The leading shutter 20A includes three blades 21a to 23a. The trailing shutter 20B includes three blades 21b to 23b. FIG. 2 illustrates the leading shutter 20A and the trailing shutter 20B in overlapped states. In FIG. 2, the leading shutter 20A and the trailing shutter 20B recedes from the opening 11. The leading shutter 20A is connected to the arms 31a and 32a. The trailing shutter 20B is connected to the arms 31b and 32b. These arms 31a, 32a, 31b, 32b are rotatably supported by the board 10.

The board 10 is provided with a leading-shutter drive lever 55a (hereinafter, referred to as drive lever) and a trailing-shutter drive lever 55b (hereinafter, referred to as drive lever) for driving the arms 31a and 31b, respectively. The drive levers 55a and 55b are connected with gears 50a and 50b, respectively. The gears 50a and 50b engage gears 40a and 40b, respectively. The gears 40a, 40b, 50a, and 50b include pipe portions 41a, 41b, 51a, and 51b respectively, and are rotatably supported around spindles 42a, 42b, 52a, and 52b fitting into the pipe portions by the board 10, respectively.

Additionally, the spindles 42a, 42b, 52a, and 52b do not have to be always formed on the board 10 in which the opening 11 is formed, and have only to be positionally fixed with respect to the opening 11.

The gears 40a and 40b are connected with rotors of the actuators 70a and 70b, respectively. The driving of the actuator 70a drives the gears 40a and 50a, thereby driving the drive lever 55a. The driving of the drive lever 55a drives the arm 31a. Thus, the leading shutter 20A moves. The leading shutter 20A is movable between a receded position where the leading shutter 20A recedes from the opening 11 and a closed position where the leading shutter 20A closes the opening 11. The leading shutter 20A is moved between the receded position and the closed position by the actuator 70a. The gears 40b and 50b, the drive lever 55b, and the trailing shutter 20B each have the similar configuration.

The gears 40a and 40b are provided with thin plates 45a and 45b, respectively. The thin plates 45a and 45b rotate together with the gears 40a and 40b, respectively. The thin plates 45a and 45b each have a fan shape. Sensors 60a and 60b, will be described in detail, are provided on the board 10.

Also, the arms 31a and 31b are connected with respective springs, not illustrated. Specifically, one end of a spring is connected with the arm 31a, and the other end is connected with the board 10. One end of the other spring is connected with the arm 31b, and the other end is connected with the board 10. These springs bias the arms 31a and 31b to move the leading shutter 20A and the trailing shutter 20B away from the opening 11, respectively.

Figure 3A:
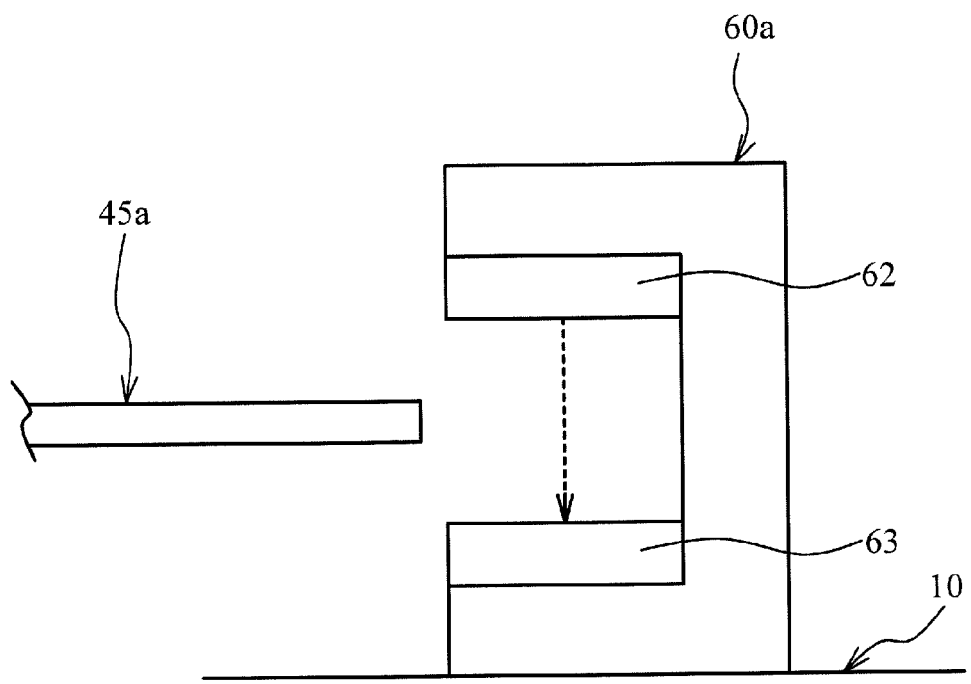
FIGS. 3A and 3B are explanatory views of a sensor.
Figure 3B:
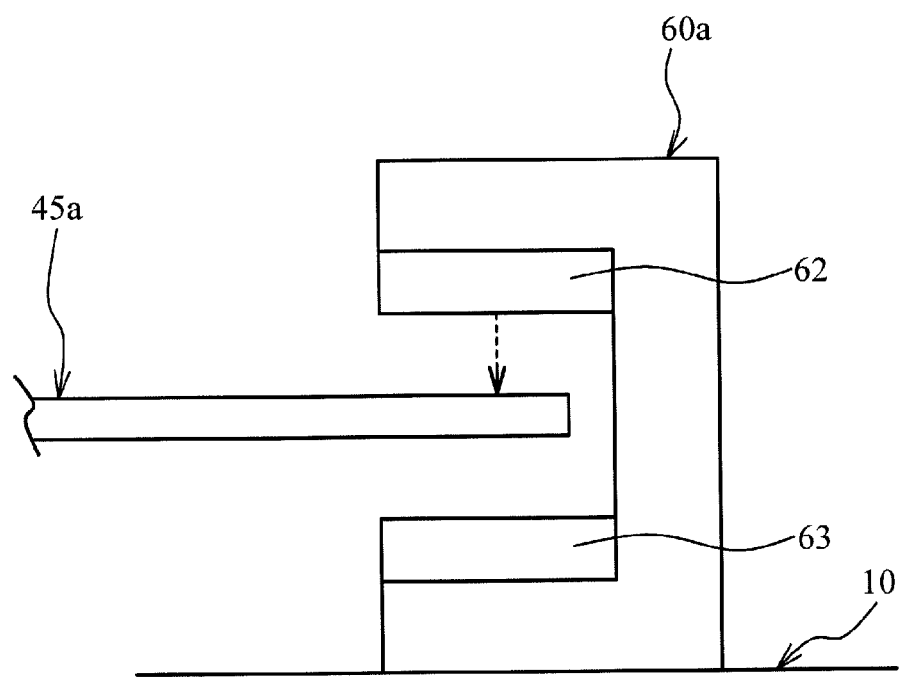

FIGS. 3A and 3B are explanatory views of the sensor 60a. The sensor 60a is arranged on the board 10. The sensor 60a has a light emitting element 62 and a light receiving element 63 that are arranged to face each other. The light receiving element 63 receives the light emitted from the light emitting element 62. As illustrated in FIGS. 3A and 3B, the rotation of the drive lever 55a moves the thin plate 45a between the light emitting element 62 and the light receiving element 63. When the thin plate 45a is located between the light emitting element 62 and the light receiving element 63, the light emitted from the light emitting element 62 is shaded. At this time, whether or not the thin plate 45a is positioned between the light emitting element 62 and the light receiving element 63 can be detected based on output signals from the light receiving element 63, thereby detecting the position of the drive lever 55a. This can result in detecting the position of the leading shutter 20A. Additionally, the sensor 60b and the thin plate 45b have the similar configurations.

Additionally, the sensor 60a is not limited to the above configuration. For example, the sensor 60a may include: a light emitting element; a mirror reflecting the light emitted from the light emitting element; and a light receiving element receiving the light reflected by the mirror. The thin plate 45a is positioned between the light emitting element and the mirror, or between the light receiving element and the mirror, thereby detecting the position of the thin plate 45a.

Next, operation of the focal plane shutter 1 will be described. FIGS. 4 to 7 are explanatory views of the operation of the focal plane shutter 1. Additionally, some parts are omitted in FIGS. 4 to 7.

Figure 4:
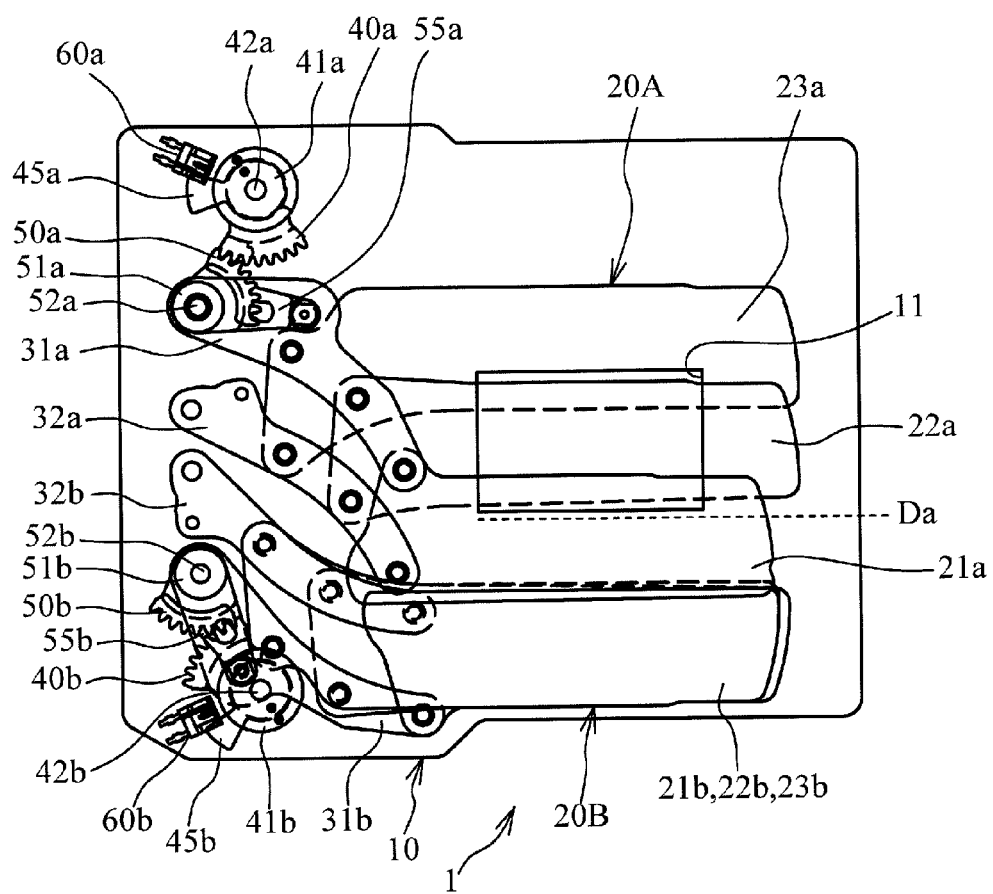
FIG. 4 is an explanatory view of an operation of the focal plane shutter.

In a wait state, as illustrated in FIG. 2, the leading shutter 20A and the trailing shutter 20B are positioned at the respective receded positions, and the opening 11 is maintained in the fully opened state. In this state, the thin plate 45a recedes from the sensor 60a. Likewise, the thin plate 45b recedes from the sensor 60b. Additionally, output signals of the sensor 60a illustrated in FIG. 4 are specifically output signals of the light receiving element 63. When the light from the light emitting element 62 is blocked by the thin plate 45a, the light receiving element 63 outputs an H signal to the control portion 110. When receiving the light from the light emitting element 62, the light receiving element 63 outputs an L signal to the control portion 110. The sensor 60b has a similar arrangement. Additionally, in the wait state illustrated in FIG. 2, the leading shutter 20A and the trailing shutter 20B are maintained at the respective receded positions where they recede from the opening 11 by the springs described above.

When a release switch of the camera A is pushed, a charging operation starts. When the charging operation starts, a coil of the actuator 70a is energized such that the leading shutter 20A moves and closes the opening 11. Specifically, the gear 40a rotates counterclockwise, and then the gear 50a rotates clockwise, which causes the arm 31a to drive. Also, the coil of the actuator 70b is not energized. Here, the drive lever 55b may temporarily come out of contact with the board 10 to perform an operation for suppressing the variations in the exposure period that will be described later. In other words, the trailing shutter 20B may be temporarily moved to the opening 11 by energizing the coil of the actuator 70b, and then the trailing shutter 20B may be moved away from the opening 11 by changing the current direction in the coil of the actuator 70b before the trailing shutter 20B is moved to fully close the opening 11.

Figure 5:
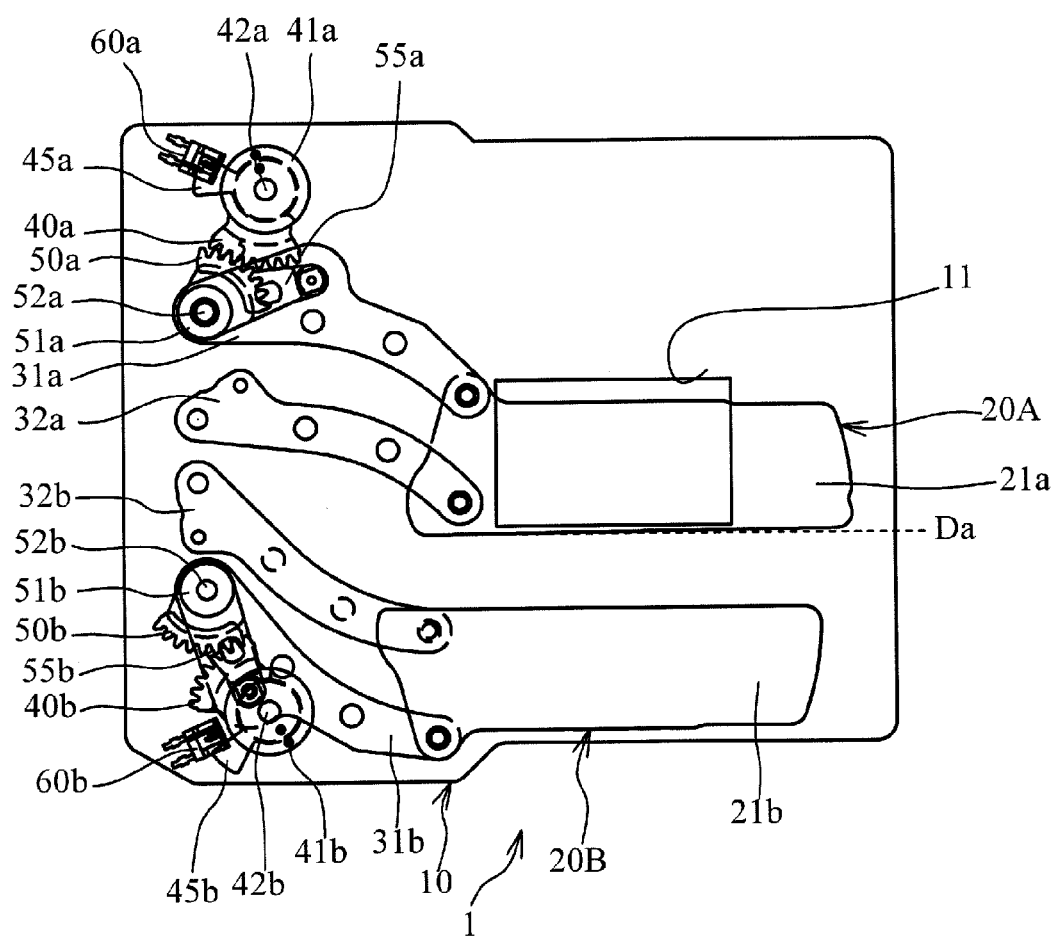
FIG. 5 is an explanatory view of the operation of the focal plane shutter.

After that, the coils of the actuators 70a and 70b stop being energized in the state where the leading shutter 20A closes the opening 11 and the trailing shutter 20B recedes from the opening 11. In such a way, the charging operation is finished. FIG. 4 illustrates the focal plane shutter 1 in the state where the charging operation is finished. In FIG. 4, the leading shutter 20A is positioned at the closed position, and the trailing shutter 20B is positioned at the receded position. Additionally, as illustrated in FIG. 5, the thin plate 45a moves to the sensor 60a and moves away therefrom again in the process that the leading shutter 20A is closing the opening 11. Therefore, the output signal from the sensor 60a is changed from the L signal into the H signal, and then it is changed into the L signal again.

After the charging operation is finished, an exposure operation starts. The control portion 110 instructs the drive control portion 170 to energize the coil of the actuator 70a such that the leading shutter 20A moves and opens the opening 11. Specifically, the gear 40a drives clockwise, and the gear 50a drives counterclockwise. In the process that the leading shutter 20A moves away from the opening 11, the thin plate 45a moves to the sensor 60a. FIG. 5 illustrates a state where the leading shutter 20A is moving. FIG. 5 illustrates the time when the blade 21a of the leading shutter 20A passes through a point Da. When the blade 21a passes through and moves away from the point Da, so the thin plate 45a moves to the sensor 60a, and then the output signal from the sensor 60a is changed from the L signal into the H signal. As mentioned above, the timing when the output signal from the sensor 60a is changed is set to be the timing when the blade 21a of the leading shutter 20A passes through the point Da. The control portion 110 detects the change in the output signal from the sensor 60a, thereby detecting that the leading shutter 20A passes through the point Da. Additionally, the timing when the output signal from the sensor 60a is changed is not limited to this timing.

After a predetermined period elapse from the time when the control portion 110 detects that the output signal from the sensor 60a is changed from the L signal into the H signal, the control portion 110 energizes the coil of the actuator 70b to start moving the trailing shutter 20B. Thus, the trailing shutter 20B moves to close the opening 11.

Figure 6:
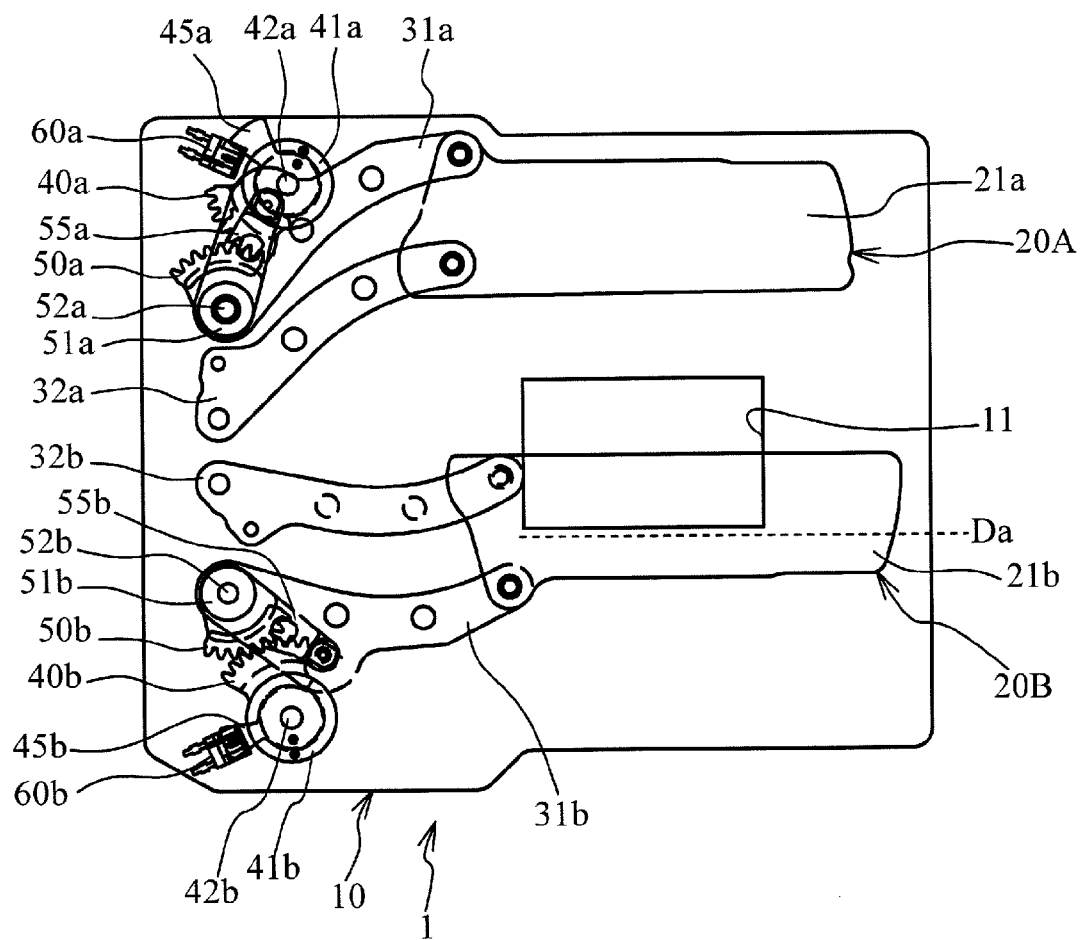
FIG. 6 is an explanatory view of the operation of the focal plane shutter.
Figure 7:
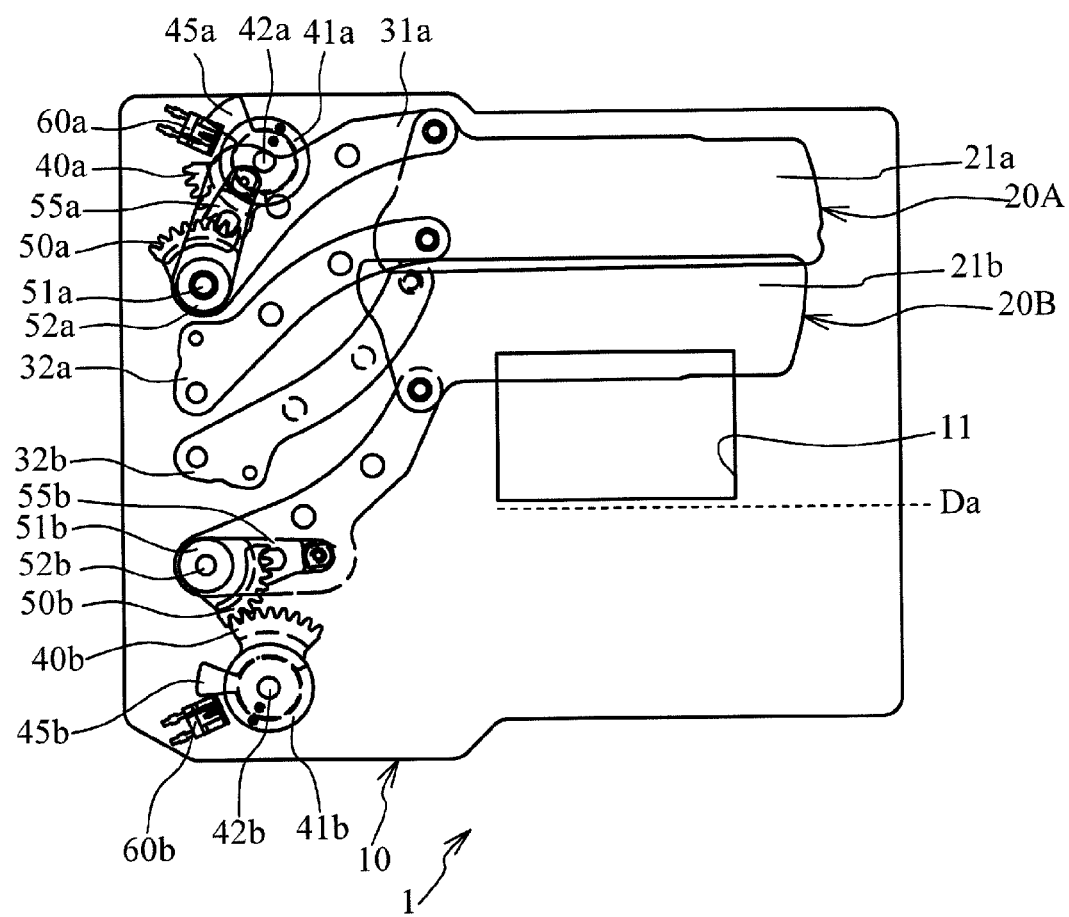
FIG. 7 is an explanatory view of the operation of the focal plane shutter.

FIG. 6 illustrates a state where the leading shutter 20A finishes moving and the trailing shutter 20B is moving. FIG. 6 illustrates the time when the blade 21b of the trailing shutter 20B passes through the point Da. When the blade 21b of the trailing shutter 20B moves to and passes through the point Da, the thin plate 45b moves to the sensor 60b, and then the output signal from the sensor 60b is changed from the L signal into the H signal. As mentioned above, the timing when the output signal of the sensor 60b is changed is also set to be the timing when the blade 21b of the trailing shutter 20B passes through the point Da. FIG. 7 illustrates a state just before the leading shutter 20A and the trailing shutter 20B stop to finish the exposure operation. When the leading shutter 20A fully recedes from the opening 11 and the trailing shutter 20B fully closes the opening 11, the actuators 70a and 70b stop being energized. The exposure operation is finished in this way. Herein, a period from the time when the leading shutter 20A starts moving to open the opening 11 to the time when the trailing shutter 20B closes the opening 11 is referred to as an exposure period.

After the exposure operation is finished, the data are output to a RAM of the control portion 110 or a memory of the camera. Next, the coil of the actuator 70b is energized so that the trailing shutter 20B moves away from the opening 11 to maintain the opening 11 in the fully opened state, whereby the state returns to an initial state illustrated in FIG. 2.

Figure 8:
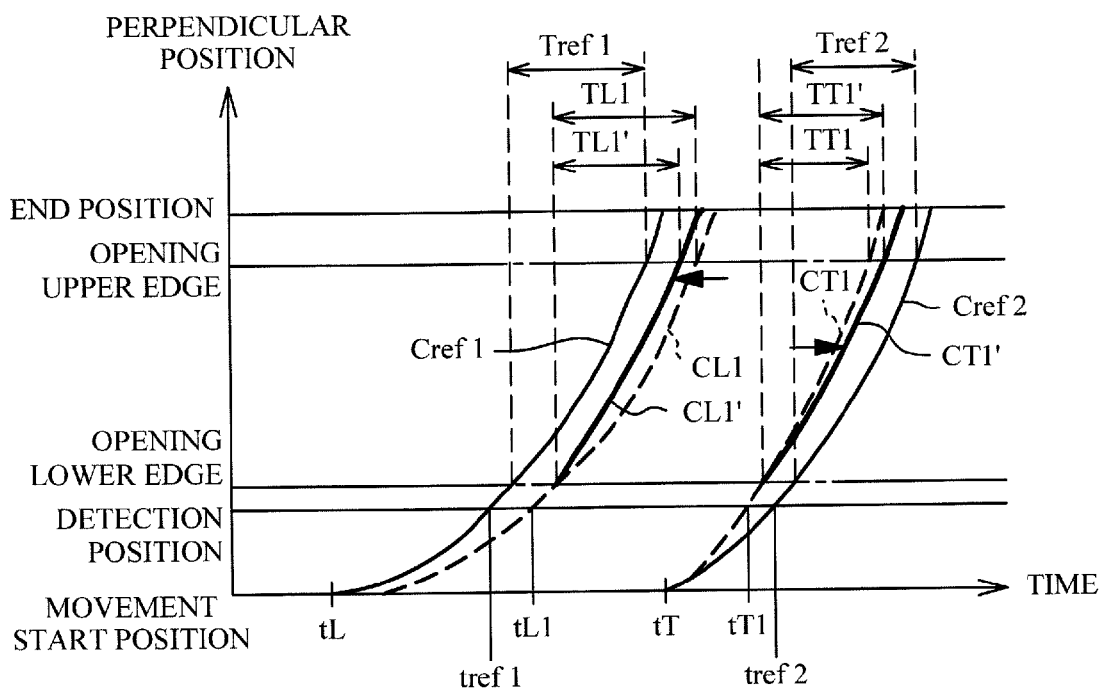
FIG. 8 is an explanatory view of a correction control.

Next, a description will be given of a correction control performed by the drive control portion 170 in the exposure operation with reference to FIG. 8. FIG. 8 is an explanation view of the correction control performed by the drive control portion 170 in the exposure operation.

Times tL and tT indicate the times when the drive control portion 170 starts supplying the power to the actuators 70a and 70b, respectively. Curves Cref1 and Cref2 indicate ideal movement states of the leading shutter 20A and the trailing shutter 20B, respectively. Reference times tref1 and tref2 indicate the times when the leading shutter 20A and the trailing shutter 20B pass through the point Da of a detection point in the ideal movement states, respectively. The reference times tref1 and tref2 are stored in the ROM of the control portion 110 or the like, beforehand. The reference times tref1 and tref2 are an example of first and second reference values, respectively. Reference periods Tref1 and Tref2 indicate the periods when the leading shutter 20A and the trailing shutter 20B pass through the opening 11 in the ideal movement states, respectively. When the leading shutter 20A and the trailing shutter 20B move in the ideal movement states, the speeds by which the leading shutter 20A and the trailing shutter 20B pass through the opening 11 are substantially the same. That is, the reference periods Tref1 and Tref2 are substantially the same. The ideal movement states mean movement properties of the leading shutter 20A and the trailing shutter 20B supposed at the time when products are shipped.

Curves CL1 and CT1 indicate actual movement states of the leading shutter 20A and the trailing shutter 20B, respectively. Times tL1 and tT1 indicate the times when the leading shutter 20A and the trailing shutter 20B actually pass through the point Da, respectively. The period from the time tL to the time tL1 corresponds to a leading-shutter approach movement period. The period from the time tT to the time tT1 corresponds to a trailing-shutter approach movement period. Periods TL1 and TT1 indicate the periods when the leading shutter 20A and the trailing shutter 20B pass through the opening 11 in the actual movements, respectively.

FIG. 8 illustrates an exemplary case where the leading shutter 20A actually moves and is delayed as compared to the ideal movement state and the trailing shutter 20B actually moves and is advanced as compared to the ideal movement state. Thus, the period TL1 is longer than the reference period Tref1. The period TT1 is shorter than the reference period Tref2. As mentioned above, the movement states of the leading shutter 20A and the trailing shutter 20B deviate from the respective ideal movement states. This is conceivably because of a use condition of the camera A, a use term thereof, accuracy of parts, and the like. As will be described later in detail, the main factors are a cumulative number of shooting times by the camera A, posture of the camera A in shooting, a heat amount of the coil, and the like. Also, in the example illustrated in FIG. 8, there is a time lag between the time tL when the leading shutter 20A starts moving in the ideal manner and the time when the leading shutter 20A actually starts moving.

Curves CL1' and CT1' indicate the movements of the leading shutter 20A and the trailing shutter 20B in a case where the drive control portion 170 corrects the power supplied to the actuators 70a and 70b while the leading shutter 20A and the trailing shutter 20B are moving, respectively. Specifically, the supplied power is corrected by correcting the current values applied to the actuators 70a and 70b and by making the voltage values applied thereto constant. Additionally, non-corrected current values applied to the actuators 70a and 70b are referred to as reference current values. The reference current value is the initial value set beforehand. In the following, a description will be given of a case of correcting the power supplied to the actuators 70a and 70b as such.

As mentioned above, when the release switch of the camera A is pushed, the control portion 110 instructs the drive control portion 170 to start supplying the power to the actuator 70a after the charging operation in which the leading shutter 20A closes the opening 11. The current having the reference current value is applied to the actuator 70a. Next, the control portion 110 obtains the time tL1 based on the outputs from the sensor 60a. On the basis of the difference between the time tL1 when the leading shutter 20A actually passes through the point Da and the reference time tref1, the drive control portion 170 corrects the power supplied to the actuator 70a, while the leading shutter 20A is moving after passing through the point Da.

In the case of FIG. 8, the actual movement of the leading shutter 20A is delayed as compared to the ideal movement. Therefore, the drive control portion 170 corrects and increases the current value as compared with the reference current value. Here, the drive control portion 170 has current value data for driving the leading shutter 20A as a non-illustrated current correction table for causing the corrected period TL1', during which the leading shutter 20A passes through the opening 11, to approach the reference period Tref1. In the case of FIG. 8, the drive control portion 170 selects, from the current correction table, a current value as a corrected current value greater than the reference current value and suitable for approaching the corrected period TL1' to the reference period Tref1.

The leading shutter 20A moves based on such a current value, thereby approaching the movement speed of the leading shutter 20A passing through the opening 11 to the ideal movement speed. Additionally, the timing when the corrected current value is applied to the actuator 70a is set to the timing when the blade 21a starts opening the opening 11 after the blade 21a passes through the point Da, but not limited to this. Additionally, in the case where the time tL1 is later than the reference time tref1 as mentioned above, the drive control portion 170 increases the power supplied to the actuator 70a as the difference between both times increases.

When the movement of the leading shutter 20A is finished, the control portion 110 instructs the drive control portion 170 to start supplying the power to the actuator 70b. The current having the reference current value is applied to the actuator 70b. Next, the control portion 110 obtains the time tT1 based on the outputs from the sensor 60b. On the basis of the difference between the time tT1 when the trailing shutter 20B actually passes through the point Da and the reference time tref2, the drive control portion 170 corrects the power supplied to the actuator 70b, while the trailing shutter 20B is moving after passing through the point Da.

In the case of FIG. 8, the actual movement of the trailing shutter 20B is advanced as compared to the ideal movement. Therefore, the drive control portion 170 corrects and decreases the current value as compared with the reference current value. Here, the drive control portion 170 has current value data for driving the trailing shutter 20B as a non-illustrated current correction table for causing the corrected period TT1', during which the trailing shutter 20B passes through the opening 11, to approach the reference period Tref2. Specifically, the drive control portion 170 selects, from the current correction table, a current value smaller than the reference current value and suitable for approaching the corrected period TT1' during which the trailing shutter 20B passes through the opening 11 to the reference period Tref2. The trailing shutter 20B moves based on such a current value, thereby approaching the movement speed of the trailing shutter 20B passing through the opening 11 to the ideal movement speed. Additionally, the timing when the corrected current value is applied to the actuator 70b is set to the timing when the blade 21b starts closing the opening 11 after the blade 21b passes through the point Da, but not limited to this. Additionally, in the case where the time tT1 is earlier than the reference time tref2 as mentioned above, the drive control portion 170 decreases the power supplied to the actuator 70b as the difference between both times increases.

As mentioned above, the power supplied to the actuators 70a and 70b are corrected such that the periods when the leading shutter 20A and the trailing shutter 20B pass through the opening 11 correspond to each other. This can suppress the variations in the exposure period. Further, this can suppress the difference between the exposure periods in the opening lower edge and in the opening upper edge. In other words, this can suppress the difference between the period, from when the leading shutter 20A starts opening the opening 11 to when the trailing shutter 20B starts closing the opening 11, and the period, from when the leading shutter 20A fully opens the opening 11 to when the trailing shutter 20B fully closes the opening 11.

It is therefore possible to suppress unevenness of exposure within the size of the opening, that is, within the opening 11.

The control portion 110 calculates the correction value for the current, based on the approach movement period of the leading shutter 20A mentioned above and the reference period between the time tL when the actuator 70a starts being energized and the reference time tref1. The corrected current value is calculated based on the calculated correction value and the reference current value. Likewise, the control portion 110 calculates the correction value for the current, based on the approach movement period of the trailing shutter 20B mentioned above and the reference period between the time tT when the actuator 70b starts being energized and the reference time tref2. The corrected current value is calculated based on the calculated correction value and the reference current value.

The increased or decreased amount of the power by correction may be made constant, and the timing of correction may be changed based on the approach movement period from when the power starts being supplied to when each of shutter actually passes through the point Da. For example, the timing of correction may be earlier as the approach movement period is longer than the reference period. The timing of correction may be later as the approach movement period is shorter than the reference period.

In the above embodiment, it is detected whether or not the blades 21a and 21b pass through the point Da, the movement distances of the blades 21a and 21b being respectively the longest in the leading shutter 20A and the trailing shutter 20B in the exposure operation. However, the detection point through which the blades 21a and 21b pass is not limited to the point Da. The detection position through which the blades 21a and 21b pass may be located between the movement start position of the blade 21a or 21b in the exposure operation and the edge position of the imaging surface of the image pickup element 130 near the movement start position. Additionally, the blades 21a and 21b are connected to distal end portions of the arms 31a and 31b, respectively.

The timing of correcting the power supplied to the actuator 70a has only to be within the period from when the leading shutter 20A passes through the point Da to when light starts entering the image pickup element 130. The timing of correcting the power supplied to the actuator 70b has only to be within the period from when the trailing shutter 20B passes through the point Da to when the trailing shutter 20B starts blocking the light entering the image pickup element 130.

The times tL1 and tT1 may be obtained in the last exposure operation, and the power supplied to the actuators 70a and 70b may be corrected in the next exposure operation. In this case, the timing of correcting the power supplied to the actuators 70a and 70b may be performed, before the leading shutter 20A and the trailing shutter 20B pass through the point Da, respectively.

Figure 9:
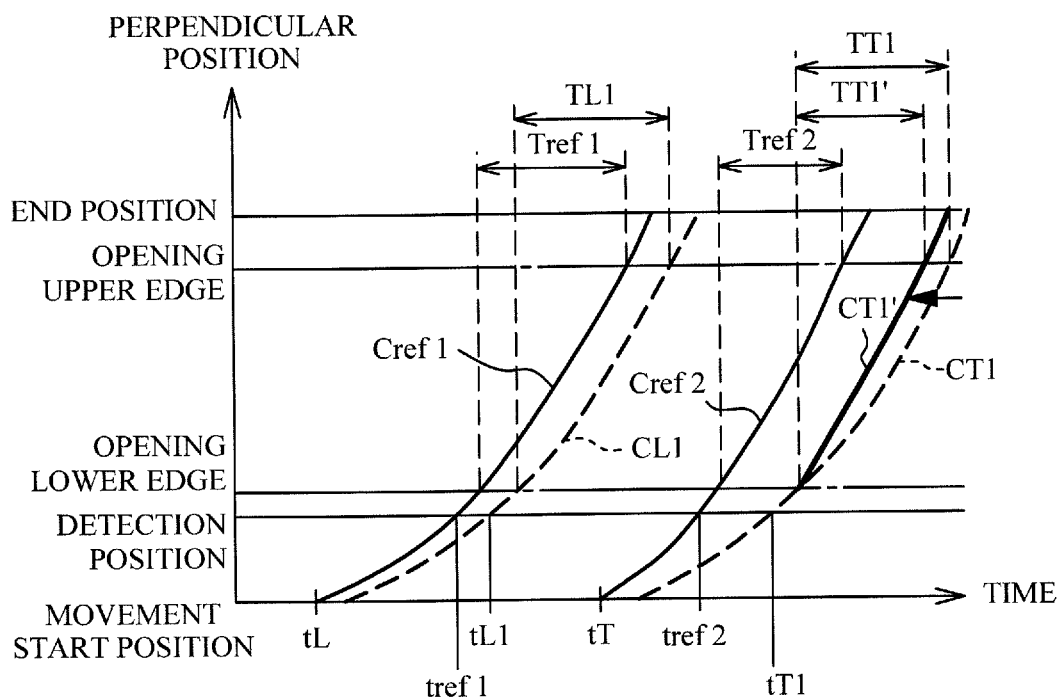
FIG. 9 is an explanatory view of a variation of the correction control.

Next, a description will be given of a variation of the correction control. FIG. 9 is an explanation view of the variation of the correction control. In FIG. 9, only the power supplied to the actuator 70b is corrected. FIG. 9 illustrates an example where the leading shutter 20A moves and is delayed as compared with the ideal movement and the trailing shutter 20B moves and is further delayed as compared with the ideal movement.

In this variation, on the basis of the approach movement periods of the leading shutter 20A and the trailing shutter 20B, the drive control portion 170 corrects the power supplied to the actuator 70b, while the trailing shutter 20B is moving after passing through the point Da. In the case of FIG. 9, the drive control portion 170 corrects and increases the current value applied to the actuator 70b as compared with the reference current value, after the trailing shutter 20B passes through the point Da. Here, the drive control portion 170 has a non-illustrated current correction table that is provided for driving the trailing shutter 20B and that associates the approach movement periods of the leading shutter 20A and the trailing shutter 20B with the current values. The current values in the current correction table are for driving the trailing shutter 20B and for approaching the corrected period TT1', during which the trailing shutter 20B passes through the opening 11, to the period TL1 during which the leading shutter 20A actually passes through the opening 11. Specifically, the drive control portion 170 selects, from the current correction table, a current value greater than the reference current value and suitable for approaching the corrected period TT1', during which the trailing shutter 20B passes through the opening 11, to the period TL1 during which the leading shutter 20A actually passes through the opening 11, on the basis of the approach movement periods of the leading shutter 20A and the trailing shutter 20B. The trailing shutter 20B moves based on such a current value, thereby approaching the movement speed of the trailing shutter 20B passing through the opening 11 to the actual movement speed of the leading shutter 20A.

Also with this arrangement, the power supplied to the actuator 70b is corrected such that the periods when the leading shutter 20A and the trailing shutter 20B pass through the opening 11 correspond to each other. This can suppress the variations in the exposure period. Further, this can suppress the difference between the exposure periods in the opening lower edge and in the opening upper edge, thereby suppressing unevenness of exposure within the size of the opening.

Second Embodiment

Figure 10:
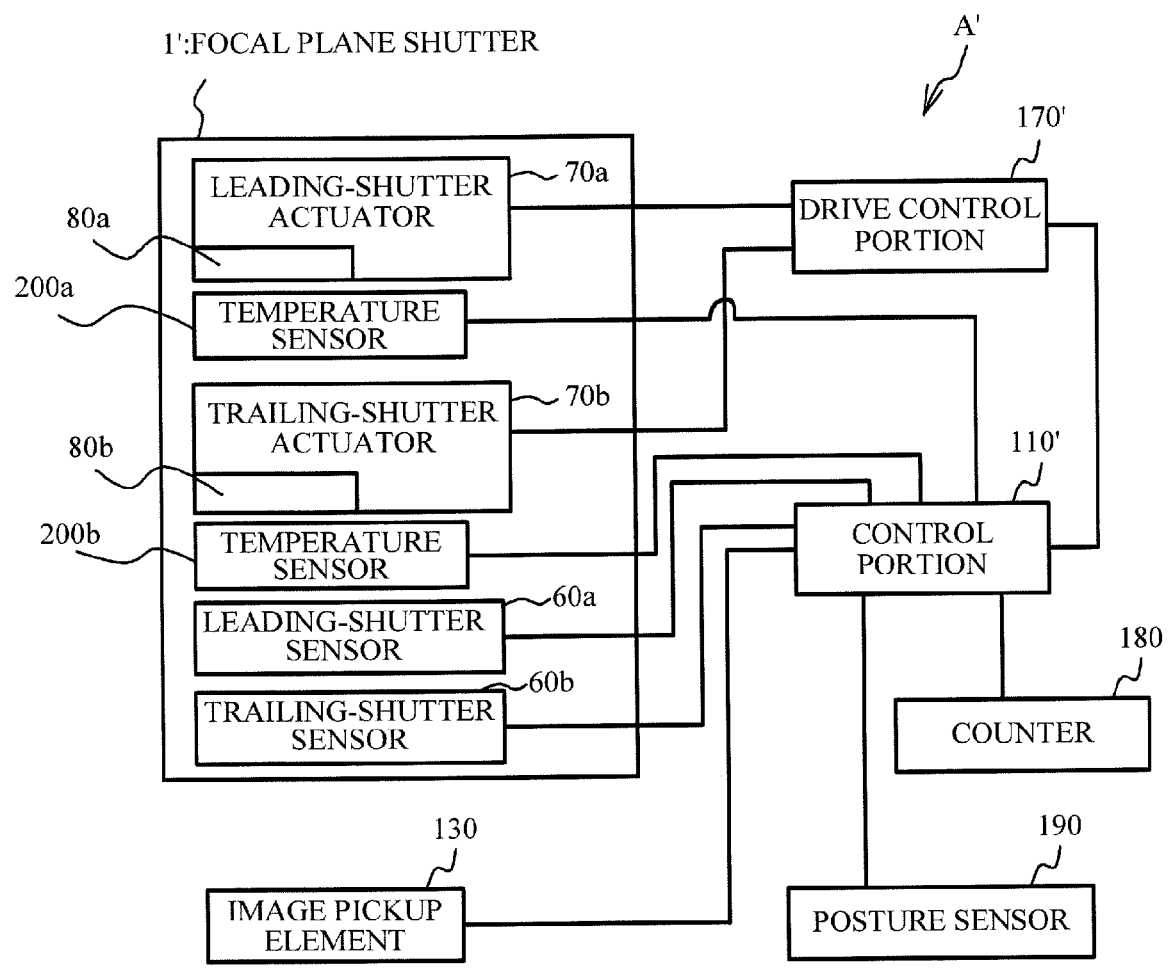
FIG. 10 is a block diagram of a camera including a focal plane shutter according to a second embodiment.

Next, a description will be given of a camera A' including a focal plane shutter 1' according to an second embodiment. Additionally, similar components of the first embodiment are designated with similar reference numerals and a description of those components will be omitted. FIG. 10 is a block diagram of the camera A' including the focal plane shutter 1' according to the second embodiment. FIG. 10 corresponds to FIG. 1. Here, the actuators 70a and 70b of the focal plane shutter 1' include coils 80a and 80b, respectively. Also, the focal plane shutter 1' includes temperature sensors 200a and 200b. The camera A' includes a counter 180 and a posture sensor 190.

Here, the counter 180 counts the cumulative number of shooting times by the camera A', and outputs the information on the cumulative number of shooting times by the camera A' to a control portion 110'. The posture sensor 190 determines the posture of the camera A', and outputs the posture difference information on the camera A' to the control portion 110'. Also, the temperature sensors 200a and 200b respectively detect the temperatures of the coils 80a and 80b, and output the information on the heat amount of the coils to the control portion 110' of the camera A'.

As mentioned above, the main factors, which cause the movement states of the leading shutter and the trailing shutter to deviate from the respective ideal movement states, are the cumulative number of shooting times by the camera, the posture in shooting, the heat amount of the coil, and the like. Here, in a case of the large cumulative number of shooting times, frictional forces between parts and the leading shutter 20A and the trailing shutter 20B sliding thereon tend to increase, so that the movement speeds of the leading shutter 20A and the trailing shutter 20B tend to decrease. Also, the speed of each shutter tends to increase or decrease depending on whether each shutter moves in the gravity direction or in the opposite direction due to the posture of the camera. Further, when the actuator is energized for a long time, the heat amount of the coil and its temperature increase. As a result, the coil resistance value increases to delay the rise of the drive current value. In other words, a long period is required for making the drive current value for driving each shutter arriving at a predetermined value. Thus, the speed of the shutter tends to decrease. With the above factors, the exposure period might be varied.

In the camera A', the power supplied to the actuators 70a and 70b is corrected based on the cumulative number of shooting times by the camera A', the posture in shooting, and the heat amount of the coil, thereby approaching the movement states of the leading shutter 20A and the trailing shutter 20B to the ideal movement states. In the following, a description will be given of a case of correcting the power supplied to the actuators 70*a* and 70*b* of the camera A' according to the second embodiment with reference to FIGS. 5, 8, and 10, like the camera A.

Like the camera A according to the first embodiment, when a release switch of the camera A' is pushed, the control portion 110' instructs a drive control portion 170' to start supplying the power to the actuator 70*a* after the charging operation in which the leading shutter 20A closes the opening 11. The current having the reference current value is applied to the actuator 70*a*. Next, the control portion 110' obtains the information on the cumulative number of shooting times by the camera A' on the basis of the outputs from the counter 180, and obtains the time tL1, as illustrated in FIG. 8, on the basis of the outputs of the sensor 60*a*. As illustrated in FIG. 5, on the basis of the information on the cumulative number of shooting times by the camera A' and the difference between the time tL1 when the leading shutter 20A actually passes through the point Da and the reference time tref1, the drive control portion 170' corrects the power supplied to the actuator 70*a*, while the leading shutter 20A is moving after passing through the point Da.

Here, the drive control portion 170' of the camera A' according to the second embodiment has a current correction table that is provided for driving the leading shutter 20A and that associates different cumulative numbers of shooting times with different current values. The current values in the current correction table are for driving the leading shutter 20A and for approaching the corrected period TL1', during which the leading shutter 20A passes through the opening 11, to the reference period Tref1.

In the case of FIG. 8, the drive control portion 170' selects, from the current correction value table corresponding to the cumulative numbers of shooting times, a current value as a corrected current value greater than the reference current value and suitable for approaching the corrected period TT1' to the reference period Tref1. The leading shutter 20A moves based on such a current value, whereby the movement speed of the leading shutter 20A passing through the opening 11 can be made close to the ideal movement speed on the basis of the cumulative number of shooting times by the camera A'. Additionally, in the case where the time tL1 is later than the reference time tref1 as mentioned above, the drive control portion 170' increases the power supplied to the actuator 70*a* as the difference between both times increases and as the cumulative number of shooting times by the camera A' increases.

When the movement of the leading shutter 20A is finished, the control portion 110' instructs the drive control portion 170' to start supplying the power to the actuator 70*b*. The current having the reference current value is applied to the actuator 70*b*. Next, the control portion 110' obtains the time tT1 based on the outputs from the sensor 60*b*. On the basis of the cumulative number of shooting times by the camera A' and the difference between the time tT1 when the trailing shutter 20B actually passes through the point Da and the reference time tref2, the drive control portion 170' corrects the power supplied to the actuator 70*b*, while the trailing shutter 20B is moving after passing through the point Da.

Also as for the trailing shutter 20B, the drive control portion 170' corrects the power supplied to the actuator 70*b*, in consideration of the information on the cumulative number of shooting times by the camera A' output from the control portion 110' and of the correction in the first embodiment. The drive control portion 170' has a current correction table that is provided for driving the trailing shutter 20B and that associates different cumulative numbers of shooting times with different current values. The current values in the current correction table are for driving the trailing shutter 20B and for approaching the corrected period TT1', during which the trailing shutter 20B passes through the opening 11, to the reference period Tref2.

In the case of FIG. 8, the actual movement of the trailing shutter 20B is advanced as compared with the ideal movement. Therefore, the drive control portion 170' corrects and reduces the current value as compared with the reference current value.

Specifically, the drive control portion 170' selects, from the current correction table corresponding to the cumulative numbers of shooting times, a current value as a corrected current value smaller than the reference current value and suitable for approaching the corrected period TT1', during which the trailing shutter 20B passes through the opening 11, to the reference period Tref2. The trailing shutter 20B moves based on such a current value, thereby approaching the movement speed of the trailing shutter 20B passing through the opening 11 to the ideal movement speed. Additionally, in the case where the time tT1 is earlier than the reference time tref2 as mentioned above, the drive control portion 170' decreases the power supplied to the actuator 70*b* as the difference between both times increases and as the cumulative number of shooting times decreases.

The drive control portion 170' may correct the power supplied to the actuators 70*a* and 70*b* based on the posture difference information on the camera A' output from the control portion 110'. In other words, the drive control portion 170' may have a current correction table that is provided for driving the leading shutter 20A and that associates different postures of the camera A' with different current values. The current values in the current correction table are for driving the leading shutter 20A and for approaching the corrected period TL1' to the reference period Tref1. The drive control portion 170' may select, from the current correction value table corresponding to the posture of the camera A', a current value as a corrected current value suitable for approaching the corrected period TL1' of the leading shutter 20A to the reference period Tref1. Likewise, the drive control portion 170' may select, from the current correction value table corresponding to the posture difference, a current value as a corrected current value suitable for approaching the corrected period TT1' of the trailing shutter 20B to the reference period Tref2. The leading shutter 20A and the trailing shutter 20B move based on such a current value, thereby further approaching the movement speeds of the leading shutter 20A and the trailing shutter 20B passing through the opening 11 to the ideal movement speed.

Also, the drive control portion 170' may correct the power supplied to the actuators 70*a* and 70*b* based on the temperature information on the coils 80*a* and 80*b* output from the control portion 110', respectively. In other words, the drive control portion 170' may have a current correction table that is provided for driving the leading shutter 20A and that associates different temperatures of the leading-shutter coil with different current values, and may have a current correction table that is provided for driving the trailing shutter 20B and that associates different temperatures of the trailing-shutter coil with different current values. The current values in these current correction tables are for approaching the movement periods of the leading shutter 20A and the trailing shutter 20B to the reference periods, respectively. The drive control portion 170' may select, from the current correction tables corresponding to temperatures of the coils 80*a* and 80*b*, current values as corrected current values suitable for approaching corrected movement periods of the leading shutter 20A and the trailing shutter 20B to the reference periods, respectively. Also with such a current value, the movement speeds of the leading shutter 20A and the trailing shutter 20B passing through the opening 11 can be approached to the ideal movement speed.

Also, the drive control portion 170' may correct the power supplied to the actuators 70a and 70b based on the cumulative number of shooting times by the camera A', the posture difference information, and the temperature information on the coils 80a and 80b, output from the control portion 110'. In other words, the drive control portion 170' may have a current correction table that is provided for driving the leading shutter 20A and that associates different cumulative numbers of shooting times by the camera A', different postures in shooting, and different temperatures of the leading-shutter coil, with different current values. The drive control portion 170' may have a current correction table that is provided for driving the trailing shutter 20B and that associates different cumulative numbers of shooting times by the camera A', different postures in shooting, and different temperatures of the trailing-shutter coil, with different current values. The current values in these current correction tables are for approaching the movement periods of the leading shutter 20A and the trailing shutter 20B to the respective reference periods. A corrected current value may be selected from plural current correction tables corresponding to the number of shooting times by the camera A', the posture in shooting, and the temperatures of the coils 80a and 80b. Also with such a current value, the movement speeds of the leading shutter 20A and the trailing shutter 20B passing through the opening 11 can be approached to the ideal movement speed.

As described above, the power supplied to the actuators 70a and 70b is corrected such that the periods when the leading shutter 20A and the trailing shutter 20B pass through the opening 11 correspond to each other, on the basis of the cumulative number of shooting times by the camera A', the posture in shooting, and the heat amount of the coils. This can suppress the variations in the exposure period. Further, this can suppress the difference between the exposure periods in the opening lower edge and in the opening upper edge, thereby suppressing unevenness of exposure within the size of the opening.

Third Embodiment

Figure 11:
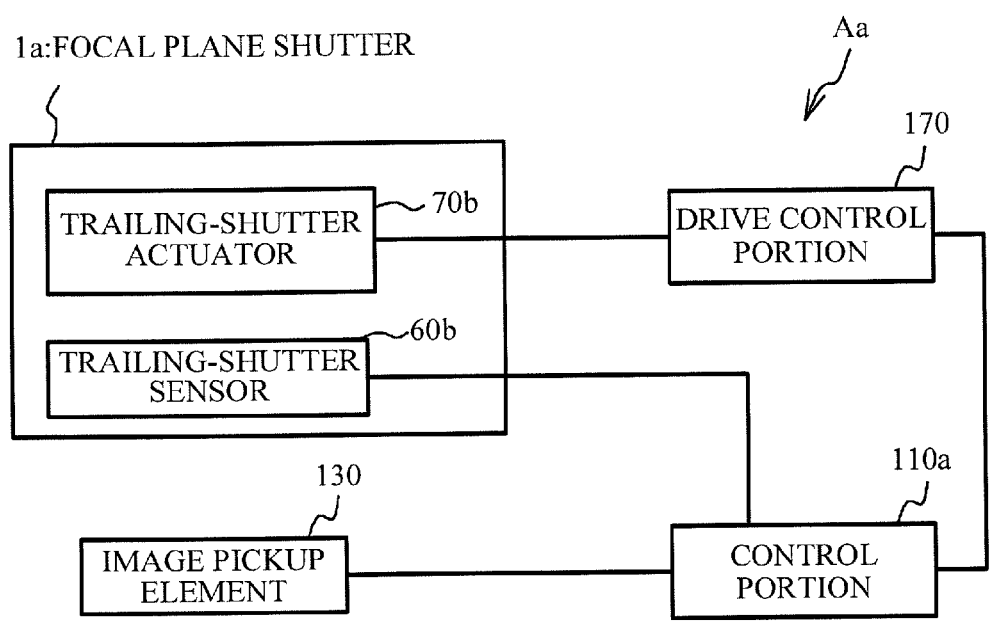
FIG. 11 is a block diagram of a camera including a focal plane shutter according to a third embodiment.
Figure 12:
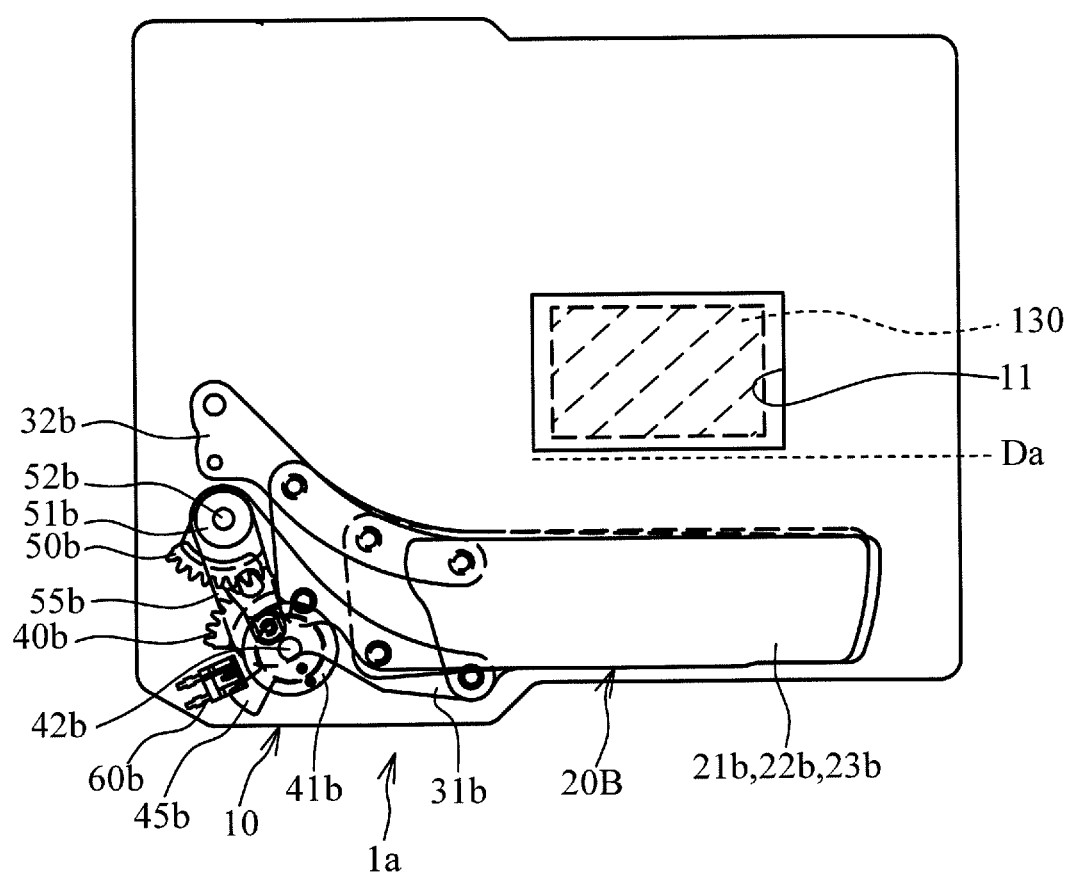
FIG. 12 is a front view of the focal plane shutter according to the third embodiment.

Next, a description will be given of a camera Aa including a focal plane shutter 1a according to an third embodiment. FIG. 11 is a block diagram of the camera Aa including the focal plane shutter 1a according to the third embodiment. FIG. 12 is a front view of the focal plane shutter 1a according to the third embodiment.

A control portion 110a sequentially resets the charge stored in the image pickup element 130 for every pixel line in a predetermined direction such that an electronic leading shutter moves in a simulated manner. Specifically, the charge stored in the image pickup element 130 are reset for every pixel line in a direction perpendicular to the movement direction of the trailing shutter 20B. Therefore, the electronic leading shutter moves from an exposure start position to an exposure end position in a simulated manner. After that, the trailing shutter 20B closes the opening 11 after a predetermined period elapses, and the exposure operation is finished. The camera Aa is an image pickup device having a so-called electronic leading shutter function. Here, the leading shutter 20A and the actuator 70a mentioned above are not provided. Also, the focal plane shutter is an electromagnetic drive type in which he actuator 70b drives the trailing shutter 20B.

Therefore, the focal plane shutter 1a has a degree of freedom in arranging components of the actuator 70b such as a coil and a stator, and can be configured in a space-saving manner, as compared to the focal plane shutter 1 according to the first embodiment.

In such a camera Aa, the drive control portion 170 corrects the power supplied to the actuator 70b based on the difference between the time tT1 and the reference time tref2 mentioned above. Here, the drive control portion 170 has current value data for driving the trailing shutter 20B as a non-illustrated current correction table for approaching the corrected period TT1', during which the trailing shutter 20B is passing through the opening 11, to the movement property of the electronic leading shutter. Specifically, the drive control portion 170 selects, from the current correction table, a current value suitable for approaching the corrected period TT1' during which the trailing shutter 20B passes through the opening 11 to the movement property of the electronic shutter, and corrects the power supplied to the actuator 70b while the trailing shutter 20B is moving. This also can suppress the variations in the exposure period. Further, this can suppress the difference between the exposure periods in the opening lower edge and in the opening upper edge, thereby suppressing unevenness of exposure within the size of the opening.

A sensor for detecting that the leading shutter 20A passes through a predetermined position is not limited to the sensor 60a. For example, there may be a switch that is pushed by any one of the arms 31a and 32a, the drive lever 55a, and the gears 50a and 40a. The sensor 60a may be a photo interrupter or a photo reflector.

While the exemplary embodiments of the present invention have been illustrated in detail, the present invention is not limited to the above-mentioned embodiments, and other embodiments, variations and modifications may be made without departing from the scope of the present invention.

The control portion 110 and the drive control portion 170 may be achieved by a single IC tip.

In above embodiments, each of the leading shutter and the trailing shutter are composed of three blades, but not limited to this.

Correcting the power supplied to the actuator 70a or 70b has only to be performed by changing at least one of a voltage value and a current value applied to the actuator 70a or 70b.

The above embodiments have described examples of correcting the power supplied to the actuators 70a and 70b on the basis of the information on the cumulative number of shooting times by the camera, the information on the posture difference, and the information on the heat amount of the coils 80a and 80b or any one thereof. On the basis of combination thereof, the power supplied to the actuators 70a and 70b may be corrected.

The above embodiment has described an example where the temperature sensors 200a and 200b respectively detect the temperatures of the coils 80a and 80b to obtain the heat amount information. Further, resistance values, in applying the power to the coils 80a and 80b, may be calculated by the resistance method, and the heat amount of each coil may be estimated to obtain the heat amount information on the coils 80a and 80b.

What is claimed is:
1. An image pickup device comprising:
a focal plane shutter including:
a board including an opening;
a leading shutter and a trailing shutter moving to open and close the opening;

a leading-shutter actuator and a trailing-shutter actuator respectively causing the leading shutter and the trailing shutter to move;

a leading-shutter sensor detecting that the leading shutter passes through a first position; and a trailing-shutter sensor detecting that the trailing shutter passes through a second position, an image pickup element that light enters through the opening; and a drive control portion correcting power supplied to the leading-shutter actuator while the leading shutter is moving, on a basis of a leading-shutter approach movement period from when the leading-shutter actuator starts being energized such that the leading shutter opens the opening to when the leading shutter passes through the first position, the drive control portion correcting power supplied to the trailing-shutter actuator while the trailing shutter is moving, on a basis of a trailing-shutter approach movement period from when the trailing-shutter actuator starts being energized such that the trailing shutter closes the opening to when the trailing shutter passes through the second position.

2. The image pickup device of claim 1, wherein the drive control portion corrects the power supplied to the trailing-shutter actuator, after the trailing shutter starts moving before the trailing shutter starts blocking light entering the image pickup element.

3. The image pickup device of claim 1, wherein the drive control portion corrects the power such that a period during which the leading shutter is passing above the image pickup element corresponds to a period during which the trailing shutter is passing above the image pickup element.

4. The image pickup device of claim 1, wherein the second position is located between a movement start position where the trailing shutter starts moving to close the opening and a position where the trailing shutter starts blocking light entering the image pickup element.

5. The image pickup device of claim 1, wherein the drive control portion corrects the power supplied to the leading-shutter actuator on a basis of a difference between the leading-shutter approach movement period and a first reference value, and corrects the power supplied to the trailing-shutter actuator on a basis of a difference between the trailing-shutter approach movement period and a second reference value.

6. The image pickup device of claim 1, wherein the drive control portion corrects the power supplied to the leading-shutter actuator and the power supplied to the trailing-shutter actuator on a basis of a cumulative number of shooting times by the image pickup device.

7. The image pickup device of claim 1, wherein the drive control portion corrects the power supplied to the leading-shutter actuator and the power supplied to the trailing-shutter actuator on a basis of posture of the image pickup device.

8. The image pickup device of claim 1, wherein
the leading-shutter actuator and the trailing-shutter actuator respectively include a leading-shutter coil and a trailing-shutter coil, and
the drive control portion corrects the power supplied to the leading-shutter actuator and the power supplied to the trailing-shutter actuator on a basis of a heat amount of the leading-shutter coil and the trailing-shutter coil.

9. The image pickup device of claim 1, wherein
the leading-shutter actuator and the trailing-shutter actuator respectively include a leading-shutter coil and a trailing-shutter coil, and the drive control portion corrects the power supplied to the leading-shutter actuator and the power supplied to the trailing-shutter actuator on a basis of at least two of a cumulative number of shooting times by the image pickup device, posture of the image pickup device, and a heat amount of the leading-shutter coil and the trailing-shutter coil.

10. An image pickup device comprising:
a focal plane shutter including:
a board including an opening;
a leading shutter and a trailing shutter moving to open and close the opening;
a leading-shutter actuator and a trailing-shutter actuator respectively causing the leading shutter and the trailing shutter to move;
a leading-shutter sensor detecting that the leading shutter passes through a first position; and a trailing-shutter sensor detecting that the trailing shutter passes through a second position,
an image pickup element that light enters through the opening; and
a drive control portion correcting power supplied to the trailing-shutter actuator while the trailing shutter is moving, on a basis of a leading-shutter approach movement period and a trailing-shutter approach movement period,
the leading-shutter approach period being from when the leading-shutter actuator starts being energized such that the leading shutter opens the opening to when the leading shutter passes through the first position, the trailing-shutter approach period being from when the trailing-shutter actuator starts being energized such that the trailing shutter closes the opening to when the trailing shutter passes through the second position.

11. The image pickup device of claim 10, wherein the drive control portion corrects the power supplied to the trailing-shutter actuator on a basis of the leading-shutter approach movement period and a difference between the trailing-shutter approach movement period and a reference value.

12. A focal plane shutter comprising:
a board including an opening;
a leading shutter and a trailing shutter moving to open and close the opening;
a leading-shutter actuator and a trailing-shutter actuator respectively causing the leading shutter and the trailing shutter to move;
a leading-shutter sensor detecting that the leading shutter passes through a first position; and
a trailing-shutter sensor detecting that the trailing shutter passes through a second position,
wherein power supplied to the leading-shutter actuator is corrected while the leading shutter is moving, on a basis of a leading-shutter approach movement period from when the leading-shutter actuator starts being energized such that the leading shutter opens the opening to when the leading shutter passes through the first position, and
power supplied to the trailing-shutter actuator is corrected while the trailing shutter is moving, on a basis of a trailing-shutter approach movement period from when the trailing-shutter actuator starts being energized such that the trailing shutter closes the opening to when the trailing shutter passes through the second position.

13. A focal plane shutter comprising:
a board including an opening;
a leading shutter and a trailing shutter moving to open and close the opening;

a leading-shutter actuator and a trailing-shutter actuator respectively causing the leading shutter and the trailing shutter to move;

a leading-shutter sensor detecting that the leading shutter passes through a first position; and a trailing-shutter sensor detecting that the trailing shutter passes through a second position, wherein power supplied to the trailing-shutter actuator is corrected while the trailing shutter is moving, on a basis of a leading-shutter approach movement period and a trailing-shutter approach movement period, the leading-shutter approach period being from when the leading-shutter actuator starts being energized such that the leading shutter opens the opening to when the leading shutter passes through the first position, the trailing-shutter approach period being from when the trailing-shutter actuator starts being energized such that the trailing shutter closes the opening to when the trailing shutter passes through the second position.

* * * * *